United States Patent [19]
Adunuthula et al.

[11] Patent Number: 6,026,404
[45] Date of Patent: Feb. 15, 2000

[54] METHOD AND SYSTEM FOR EXECUTING AND OPERATION IN A DISTRIBUTED ENVIRONMENT

[75] Inventors: Seshu Adunuthula, Foster City; Elaine Chien, Redwood City; Mala Anand, Palo Alto, all of Calif.

[73] Assignee: Oracle Corporation, Redwood Shores, Calif.

[21] Appl. No.: 08/962,414

[22] Filed: Oct. 31, 1997

Related U.S. Application Data

[63] Continuation-in-part of application No. 08/794,269, Feb. 3, 1997.

[51] Int. Cl.$^7$ .................................................. G06F 17/30
[52] U.S. Cl. ........................... 707/10; 707/104; 395/674; 395/675; 395/682; 395/684; 395/200.56; 395/200.33
[58] Field of Search ..................... 707/10, 104; 395/674, 395/675, 200.56, 200.33, 682, 684

[56] References Cited

U.S. PATENT DOCUMENTS

| | | | |
|---|---|---|---|
| 5,329,619 | 7/1994 | Page et al. | 395/200 |
| 5,361,350 | 11/1994 | Conner et al. | 395/600 |
| 5,457,797 | 10/1995 | Butterworth et al. | 395/682 |
| 5,546,584 | 8/1996 | Lundin et al. | 395/700 |
| 5,613,148 | 3/1997 | Bezviner et al. | 395/800 |
| 5,623,656 | 4/1997 | Lyons | 707/10 |
| 5,706,442 | 1/1998 | Anderson et al. | 395/227 |
| 5,737,592 | 4/1998 | Nguyen et al. | 395/604 |
| 5,737,607 | 4/1998 | Hamilton et al. | 395/701 |
| 5,745,681 | 4/1998 | Levine et al. | 709/200 |
| 5,752,246 | 5/1998 | Rogers et al. | 707/10 |
| 5,761,507 | 6/1998 | Govett | 395/684 |
| 5,761,662 | 6/1998 | Dasan | 707/10 |
| 5,761,673 | 6/1998 | Bookman et al. | 707/104 |
| 5,761,684 | 6/1998 | Gibson | 707/515 |
| 5,774,670 | 6/1998 | Montulli | 395/200.57 |
| 5,778,224 | 7/1998 | Tobe et al. | 395/670 |
| 5,796,393 | 8/1998 | MacNaughton et al. | 345/329 |

(List continued on next page.)

FOREIGN PATENT DOCUMENTS

WO97/40457 10/1997 WIPO ............................. G06F 17/30

OTHER PUBLICATIONS

Evans, E., et al., Using Java applets and CORBA for Multi–user distributed applications, IEEE Internet Computing, vol. 1, No. 3, May, 1997, pp. 43–55.

(List continued on next page.)

*Primary Examiner*—Anton Fetting
*Assistant Examiner*—Jean M. Corriélus
*Attorney, Agent, or Firm*—McDermott, Will & Emery

[57] ABSTRACT

A system, method, and computer readable-medium for performing operations associated with browser requests are provided. The system includes a plurality of dispatchers coupled to a plurality of web listeners. Each of the dispatchers receives from a corresponding web listener browser requests received by the corresponding web listener. The dispatchers are configured to send messages through an inter-machine communication mechanism to cartridge instances. The messages cause the cartridge instances to perform the operations associated with the browser requests. Each cartridge instances includes a cartridge execution engine and a cartridge. The cartridge execution engine handles all inter-machine communication with the dispatchers, and passes the requests to the cartridges by making calls into the application programming interface of the cartridge. Consequently, cartridges are isolated from the complexities of inter-machine communication, and may therefore by used in a highly distributed system without being distribution-aware.

28 Claims, 6 Drawing Sheets

U.S. PATENT DOCUMENTS

| | | | |
|---|---|---|---|
| 5,822,585 | 10/1998 | Noble et al. | 395/680 |
| 5,826,239 | 10/1998 | Du et al. | 705/8 |
| 5,826,242 | 10/1998 | Montulli | 705/27 |
| 5,835,712 | 11/1998 | DuFresne | 709/203 |
| 5,848,246 | 12/1998 | Gish | 709/228 |
| 5,857,191 | 1/1999 | Blackwell et al. | 707/10 |
| 5,859,971 | 1/1999 | Bittinger et al. | 709/203 |
| 5,859,972 | 1/1999 | Subramaniam et al. | 395/200.33 |
| 5,860,072 | 1/1999 | Schofield | 707/101 |
| 5,862,325 | 1/1999 | Reed et al. | 395/200.31 |
| 5,864,866 | 1/1999 | Henckel et al. | 707/103 |
| 5,864,871 | 1/1999 | Kitain et al. | 707/104 |
| 5,897,622 | 4/1999 | Blinn et al. | 705/26 |
| 5,909,492 | 6/1999 | Payne et al. | 380/24 |

OTHER PUBLICATIONS

Edwards, N., et al., "High security Web servers and gateways," Computer Nteworks and ISDN Systems, vol. 29, No. 8–13, Sep., 1997, pp. 927–938.

Luotonen et al., "World–Wide Web proxies", pp. 147–154, computer Network and ISDN system, Jan. 1994.

James Powell, "Creating a Hypertext library information system," pp. 59–66, Feb. 1994.

"Oracle Version 7", Computergram International, Jun. 1992.

"Oracle Rides the Internet with Web", Computergram International, Feb. 1995.

"Sun Java, Netscape Livescript Married as Javascript", Computergram International, Dec. 1995.

Marshall et al. "Industry Lines Up for Java—Vendors Set Stage for Dynamic", Commications Week, Dec. 1995.

"Oracle Unveils Oracle Websystem Internet Line", Computergram International, Nov. 1995.

Marshall, Martin "Sybase Sites to Get Web Links", Communciations Week, Nov. 1995.

Karpinski, Richard "Oracle Readies Web Initative–Businesses Can Tie Their Databases Directly to the Web", Interactive Age, n207, p. 1, Jan. 1995.

"Hypercard–Based Oracle Card for Macintosh, Windows 3.0", Computergram International, Jan. 1991.

Karpinski, Richard "Web–Based Help Desks Debut", Communications Week, Oct. 1995.

Clinton et al. "Intranet Tools: Coprorations Seek Internal Web Applications—and Major vendors are Happy to Help", Informationweek, n552, p14(2), Nov. 1992.

Nash, Kim S. "Web Browser Makers Follw Modular Trend", News, Apr. 1996.

"ObjectShare IntroducesjKit/Grid; First Offering in a New Line of Advanced Java Components; Extensible New Software Provides Powerful Java Classes for Grids, Tables and More; Advanced Component Automatically Reacts to Data Changes", Buisness Wire, pp, Oct. 1996.

"Oracle Begins Internet Initiative:Multimedia, Hypertext Development Tools", Seybold Report on Desktop Publishing, v9, n7, p27(1), Mar. 1995.

"Sybase: Sybase Introduces Powersite Enterprise Web Development Environment", M2 Communications, Dec. 1997.

Gray, J., et al: "Scale Up with TP Monitors," 4465 BYTE, vol. 20, No. 4, Apr., 1995.

Szmurlo, Maurice, et al., "A Network of Asynchronous Micro–Servers as a Framework for Server Development," Computer Networks and ISDN Systems, vol. 29, No. 8–13, Sep. 1997.

Web Page containing an article written by Rich Levin titled "NetDynamics to Launch Web Database Development System Upgrade," Sep. 29, 1997 (As printed on Dec. 11, 1997).

KIVA Software Corporation, "Developing and Managing Web–based Enterprise Applications."

Progress Software, "Webspeed 1.0 technical product brief" 1998, wysiwyg://90/http://www.progress–softwa...ernet/webspeed/white/tech/docs/arch.html.

Computer Reseller News "Progress Software offers tools to speed use of Web", Oct. 7, 1996, http://proquest.umi.com/pqdweb?TS=91798 . . . &Sid=1&Deli=1&RQT=309&Dtp=1.

Butler Group Technology Audits, "Butler Group Webspeed Technology Audit" 1996, http://www.realtime.co.za/webspeed/whitep/wp03.html.

Netscape "Persistent Client State HTTP Cookies" 1997, http://home.netscape.com/newsref/std/cookie_spec.html.

M/Gateway Developments Ltd. "Persistence and State Awareness in WebLink" 1996, http://www.intersys.com/products/whitepapers/weblink_state.html.

| INSTANCE | CARTRIDGE | STATUS |
|----------|-----------|--------|
| 1 | C1 | BUSY |
| 3 | C1 | FREE |
| 7 | C1 | BUSY |
| 1 | C2 | BUSY |
| 5 | C2 | FREE |
| 3 | C3 | BUSY |

FIG. 4

| INSTANCE | CARTRIDGE | LISTENER | MACHINE |
|---|---|---|---|
| 1 | C1 | L210 | M1 |
| 3 | C1 | L210 | M2 |
| 7 | C1 | L210 | M3 |
| 1 | C2 | L210 | M1 |
| 5 | C2 | L210 | M1 |
| 3 | C3 | L210 | M3 |
| 2 | C1 | L216 | M1 |
| 4 | C1 | L216 | M2 |
| 5 | C1 | L216 | M3 |
| 3 | C2 | L216 | M1 |
| 4 | C2 | L216 | M1 |
| 1 | C3 | L216 | M3 |
| 2 | C2 | UNOWNED | M1 |
| 2 | C3 | UNOWNED | M2 |

FIG. 5

METHOD AND SYSTEM FOR EXECUTING AND OPERATION IN A DISTRIBUTED ENVIRONMENT

This application is a continuation in part of Ser. No. 08/794,269 filed Feb. 3, 1997.

FIELD OF THE INVENTION

This invention relates to server architectures in networked computer systems, more specifically to facilitating distributed software development in a distribution unaware manner.

BACKGROUND OF THE INVENTION

The World Wide Web includes a network of servers on the Internet, each of which is associated with one or more HTML (Hypertext Markup Language) pages. The HTML pages associated with a server provide information and hypertext links to other documents on that and (usually) other server. Servers communicate with clients by using the Hypertext Transfer Protocol (HTTP). The servers listen for requests from clients for their HTML pages, and are therefore often referred to as "listeners".

Users of the World Wide Web use a client program, referred to as a browser, to request, decode and display information from listeners. When the user of a browser selects a link on an HTML page, the browser that is displaying the page sends a request over the Internet to the listener associated with the Universal Resource Locator (URL) specified in the link. In response to the request, the listener transmits the requested information to the browser that issued the request. The browser receives the information, presents the received information to the user, and awaits the next user request.

Traditionally, the information stored on listeners is in the form of static HTML pages. Static HTML pages are created and stored at the listener prior to a request from a web browser. In response to a request, a static HTML page is merely read from storage and transmitted to the requesting browser. Currently, there is a trend to develop listeners that respond to browser requests by performing dynamic operations. For example, a listener may respond to a request by issuing a query to a database, dynamically constructing a web page containing the results of the query, and transmitting the dynamically constructed HTML page to the requesting browser. To perform dynamic operations, the functionality of the listener must be enhanced or augmented. Various approaches have been developed for extending listeners to support dynamic operations.

One approach to providing dynamic operations in response to requests from web browsers uses the common gateway interface (CGI). CGI is a specification for transferring information between a listener and a CGI program. A CGI program is any program designed to accept and return data that conforms to the CGI specification. The program could be written in any programming language, including C, Perl, or Visual Basic.

The CGI approach suffers from the disadvantage that a separate process (a separate instance of the CGI program) is initiated each time the specified request is received by the server. Further, CGI programs execute on the same machine as the listener that received the browser request. Consequently, receipt of a thousand such requests from different users will cause a thousand processes to be initiated on the machine running the listener, exhausting available resources on the server.

A second disadvantage of the CGI approach is that a separate process is initiated, executed and terminated for each request. Thus, if a first set of ten requests are followed by a second set of ten requests, a first set of ten processes will be initiated and terminated for the first set of requests and a second set of ten processes will be initiated and terminated for the second set of requests. CGI does not allow using the same ten processes that are used for the first ten requests to process the second ten requests to avoid overhead associated with initiating processes.

An alternative approach to providing dynamic responses to requests involves using "plug-in" extensions. A plug-in extension intercepts messages sent to the server at various stages to perform application-specific processing for a specific user request. A server-side plug-in executes in the same address space as the listener and all other server-side plug-ins. Hence, an application developer designing a plug-in must be familiar with the lower level operational details of the listener. Moreover, execution of the plug-ins in the same address space as the listener exposes the listener to security and stability risks, where a faulty plug-in may cause other plug-ins or the listener itself to crash, or perform in an unpredictable manner.

A second problem with the plug-in approach is that, similar to the CGI approach, all plug-in operations are performed on the same machine that is executing the listener. Because the tasks performed by the plug-in extensions cannot be off-loaded to other machines, the scalability of the plug-in approach is significantly limited.

SUMMARY OF THE INVENTION

A method and system are provided for executing operations in a distributed environment in a manner that does not require the modules executing the operation to be distribution aware. The distributed environment allows processes ("cartridge instances") that perform the operations specified in the browser requests to execute on different machines than the listeners that receive the requests and the browsers that issue the requests. Because the cartridge instances are on different machines than the listeners, the listeners are better insulated against faulty cartridge instances, thus enhancing the reliability and security of the system. In addition, the scalability of the system is greatly increased by spreading the processing burden of executing the cartridge instances among many machines, rather than the same machine that is executing the listener. The ability to distribute cartridge instance execution across multiple machines allows numerous types of load balancing techniques to be used in deciding when and where to spawn new cartridge instances.

The benefits that derive from the distributed nature of the system are enjoyed with minimal burden to the cartridge developers. Specifically, cartridges need not be "aware" of the fact that they are operating as part of the distributed system because they are insulated from the complexities of the distributed system by modules referred to herein as cartridge execution engines. The insulation thus achieved allows cartridge developers to focus on the problem to which their cartridge is directed, rather than the complexities of inter-machine communication.

According to one aspect of the invention, a dispatcher executes on a first machine. A cartridge execution engine executes on a second machine that is different from the first machine. The dispatcher receives from a web listener a first message that requests execution of the operation. The first message was sent to the dispatcher in response to the web listener receiving a browser request from a browser.

In response to the first message, the dispatcher sends a second message to the cartridge execution engine. In response to the second message, the cartridge execution engine passes a third message to a cartridge that is executing on the second machine. In response to receiving the third message, the cartridge executes the operation. Because requests to the cartridge are sent through the cartridge execution engine and the cartridge execution engine resides on the same machine as the cartridge, the cartridge execution engine effectively insulates the cartridge from the complexities of supporting inter-machine communication.

According to another aspect of the invention, a system for performing operations associated with browser requests is provided. The system includes a plurality of dispatchers coupled to a plurality of web listeners, an inter-machine communication mechanism, and a plurality of cartridges. The cartridges are called through a standard cartridge interface but perform different operations.

The system also includes a plurality of cartridge execution engines that communicate with the plurality of dispatchers through the inter-machine communication mechanism and communicate with the plurality of cartridges by making calls to routines in the plurality of cartridges through the standard cartridge interface. Each dispatcher is configured to a send through the inter-machine communication mechanism a first message to a particular cartridge execution engine of the plurality of cartridge execution engines in response to a web listener receiving a browser request that requires a particular cartridge to perform an operation. The particular cartridge execution engine is configured to respond to the first message by calling through the standard cartridge interface a routine in the particular cartridge that performs the operation.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a block diagram of a table containing information maintained by a dispatcher according to an embodiment of the invention; and FIG. 5 is a block diagram of a table containing information maintained by a resource manager according to an embodiment of the invention.

DETAILED DESCRIPTION OF THE PREFERRED EMBODIMENT

A method and apparatus for performing operations over a network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
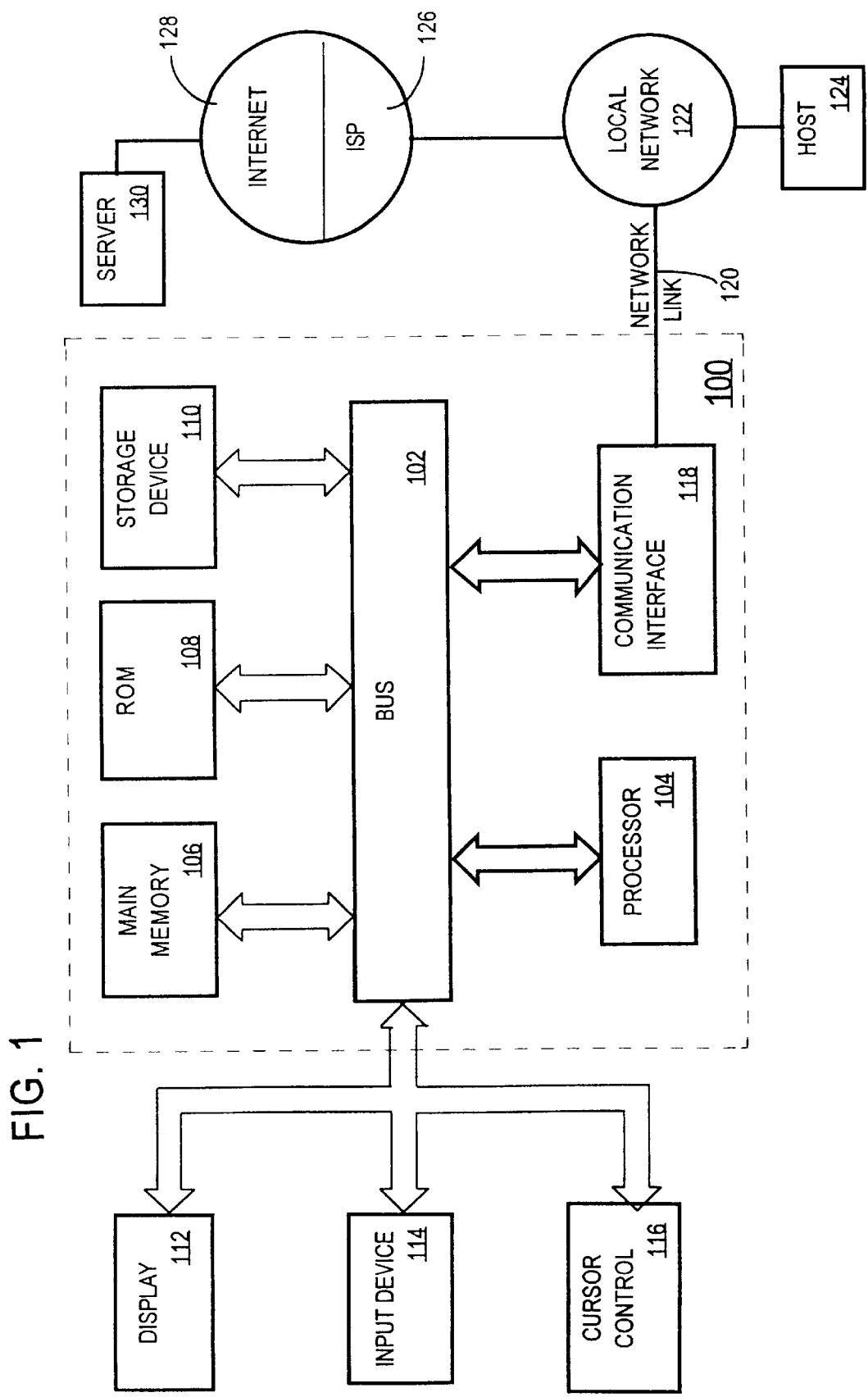
FIG. 1 is a block diagram of a computer system upon which an embodiment of the invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 to perform specific operations in response to messages from browsers. According to one embodiment of the invention, the operations are performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer system 100 may obtain application code in the form of a carrier wave.

Functional Overview of Application Server

Figure 2:
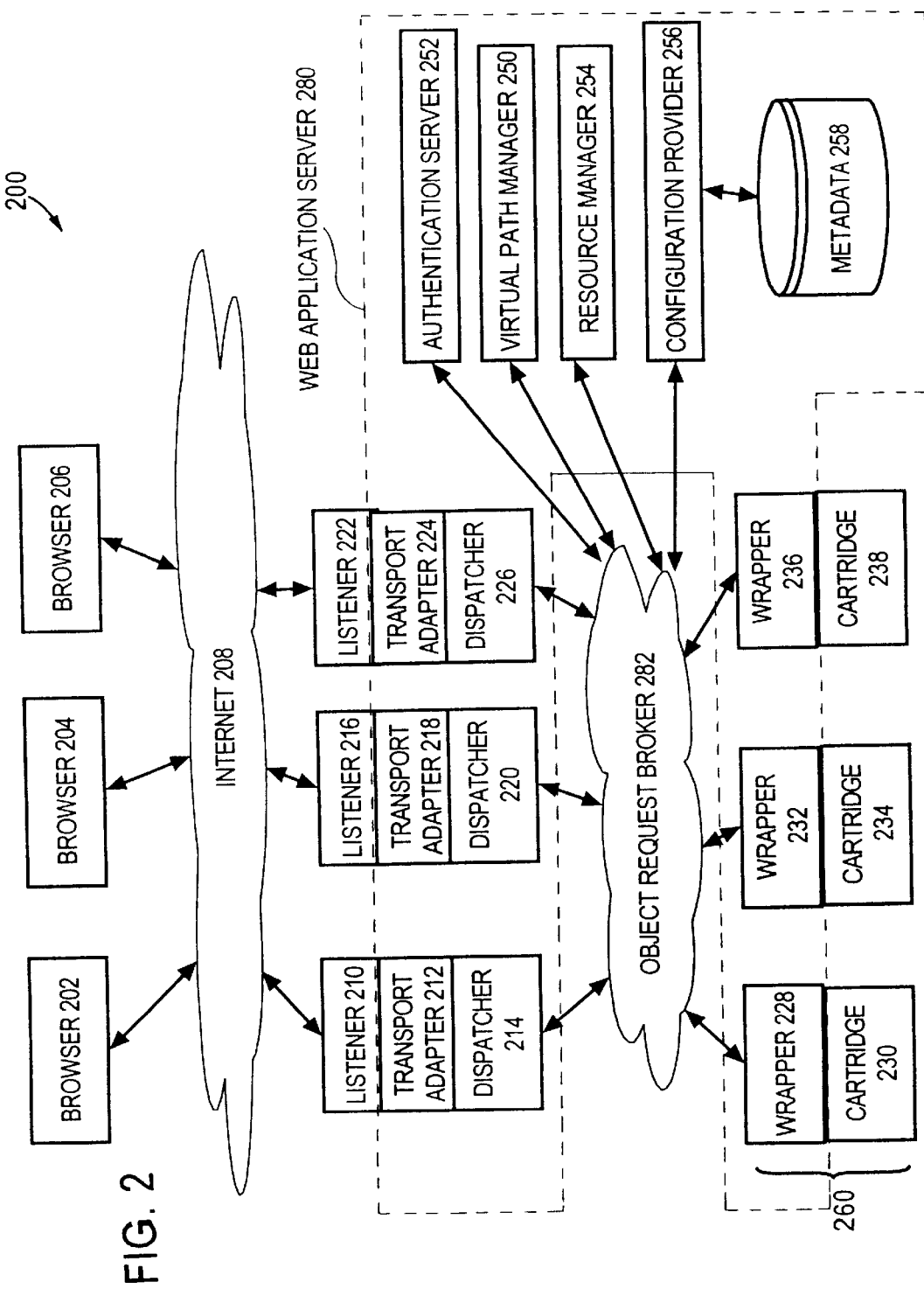
FIG. 2 is a block diagram of a distributed application server according to an embodiment of the invention.

FIG. 2 is a block diagram of a system 200 designed according to an embodiment of the invention. The system 200 includes a plurality of browsers 202, 204 and 206 that communicate with a plurality of listeners 210, 216 and 222 over the Internet 208 according to the HTTP protocol. In response to requests from the browsers, the listeners cause a web application server 280 to invoke software modules, referred to herein as cartridges. In the illustrated embodiment, web application server 280 has initiated the execution of three cartridges 230, 234 and 238.

The web application server 280 is composed of numerous components, including transport adapters 212, 218 and 224, dispatchers 214, 220 and 226, an authentication server 252, a virtual path manager 250, a resource manager 254, a configuration provider 256 and a plurality of cartridge execution engines 228, 232 and 236. The various components of the web application server 280 shall be described hereafter in greater detail.

Significantly, the numerous components of web application server 280 communicate through an inter-machine communication mechanism, such as an Object Request Broker 282. Using an inter-machine communication mechanism, cartridge instances that perform the operations specified in browser requests may execute on different machines than the listeners that receive the requests and the browsers that issue the requests. Because the cartridge instances are on different machines than the listeners, the listeners are better insulated against faulty cartridge instances, thus enhancing the reliability and security of the system. In addition, the scalability of the system is greatly increased by spreading the processing burden of executing the cartridge instances among many machines, rather than the same machine that is executing the listener. The ability to distribute cartridge instance execution across multiple machines allows numerous types of load balancing techniques to be used in deciding when and where to spawn new cartridge instances.

A typical operation within system 200 generally includes the following stages:

A browser transmits a request over the Internet 208.

A listener receives the request and passes it through a transport adapter to a dispatcher.

The dispatcher communicates with the virtual path manager 250 to determine the appropriate cartridge to handle the request.

At this point the dispatcher does one of two things. If the dispatcher knows about an unused instance for that cartridge, the dispatcher sends the request to that instance. If there are no unused cartridge instances for that cartridge, the dispatcher asks the resource manager 254 to create a new cartridge instance. After the instance starts up successfully, the cartridge notifies the resource manager of its existence. The resource manager 254 then notifies the dispatcher of the new instance. The dispatcher creates a revised request based on the browser request and sends the revised request to the new instance.

The cartridge instance handles the revised request and sends a response to the dispatcher.

The dispatcher passes the response back through the listener to the client.

These stages shall be described in greater detail hereafter.

Cartridges

Cartridges are modules of code for performing specific application or system functions. A cartridge forms the basic unit of distribution in the system 200. According to one embodiment of the invention, cartridges are named using Universal Resource Locators (URLs). Thus, a cartridge name has two parts: the IP address of the server on which the cartridge resides, and the virtual path in the server directory structure of the compiled cartridge code. Because cartridges are named using URLs, the cartridge name space is global and cartridges may be accessed using the same messaging techniques as are used to access other web resources, such as documents.

According to one embodiment of the invention, each cartridge has a standard interface which provides a common overall structure for all cartridges. The standard interface defines the interface of routines that are invoked by the web application server 280 under particular conditions. According to one embodiment of the invention, the abstract cartridge interface is as follows:

interface Cartridge
{boolean init(); boolean authenticate(in Principal user_passwd); boolean exec(in Request req_obj, out Response resp_obj); boolean shutdown();}

The init() routine is responsible for intializing the cartridge instance. This may include invoking the constructors of several subobjects, preforking threads and acquiring all other required shared resources.

The shutdown() routine is responsible for cleaning up all of the resources and shutting down the cartridge instance. Once the shutdown() routine is invoked on a cartridge instance, it immediately becomes unavailable for servicing subsequent requests.

The authenticate() routine validates whether the client requesting the services of the cartridge is authorized to use those services.

The exec() routine is the generic way to dispatch all service requests to the cartridge.

Exemplary Cartridges

Each cartridge is either configured as a cartridge that performs a well-defined function, or as a programmable cartridge that acts as an interpreter or a routine environment for an application. An example of a programmable cartridge is a PL/SQL runtime, configured to process database queries according to the Oracle-based Programming Language using Structured Query Language (PL/SQL). The PL/SQL runtime executes a browser request having a database query. The PL/SQL runtime processes the request, for example, by accessing a database server in communication with the cartridge instance via a data link.

Another example of a programmable cartridge is a JAVA runtime interpreter. The JAVA runtime interpreter cartridge enables web application developers to write server-side JAVA applications to process browser requests. Similarly, a custom server may be configured as a cartridge in order to provide dynamic operations such as, for example, accessing processes executed by a third party server.

Dispatchers

Dispatchers are software modules configured to route the requests received by listeners to the appropriate cartridges. According to one embodiment of the invention, dispatchers are implemented as server-side program extensions (i.e. "plug-ins"). As such, the dispatchers are loaded into and execute within the same address space as the listeners to which they belong. The dispatchers may be linked with the listener code at compile time or dynamically loaded at runtime.

In the illustrated embodiment, dispatchers 214, 220 and 226 are associated with listeners 210, 216 and 222, respectively. Dispatchers 214, 220 and 226 selectively route browser requests received by listeners 210, 216 and 222 to cartridges.

For example, assume that listener 210 receives a browser request over the Internet 208 delivered in the form of a Uniform Resource Locator (URL). The browser request serves as an identifier for a web object, for example an HTML page or an operation to be performed. The listener 210 hands off the browser request to dispatcher 214 without any attempt at interpreting the browser request. Upon receiving the browser request, the dispatcher 214:

(1) communicates with virtual path manager 250 to identify a cartridge selected by the browser request and determine whether the cartridge requires authentication, (2) if the cartridge requires authentication, communicates with the authentication server 252 to determine whether the browser is allowed to access the selected cartridge, (3) if access is authorized, communicates with the resource manager to determine the specific instance of the selected cartridge to which the browser request should be sent, and (4) creates and dispatches a revised browser request for execution by the specified instance of the cartridge.

The revised browser request repackages information received in the original browser request. The revised browser request may include, for example, a context object that contains data required for the proper operation of the cartridge. The data required for proper operation of a cartridge may include, for example, a transaction ID that identifies a transaction with which the browser request is associated.

If the cartridge replies to the request, the cartridge sends the reply to the dispatcher and the dispatcher passes the reply up to the listener for transmission to the browser that initiated the request.

Configuration Provider

According to one embodiment of the invention, cartridges that are to be used with web application server 280 are first registered with web application server 280. During the registration process, information about the cartridges is supplied to the configuration provider 256. Configuration provider 256 stores the information as metadata 258 for later access by the components of the web application server 280.

The metadata 258 may include, for example, (1) the cartridge name;

(2) the minimum number of required instances;

(3) the maximum number of instances;

(4) the location of the code that implements the cartridge;

(5) the program-dependent function names used by the cartridge execution engine to execute the callback functions (initialization, request handler, shutdown);

(6) a list of machines for running the cartridge;

(7) the idle time for the cartridge (the amount of time instances of the cartridge are allowed to remain idle before they are shut down);

(8) an object identifier; and (9) data indicating the type of authentication service, if any, to be used with the cartridge.

The object identifier specifies the data that must be supplied by a browser request for requesting performance of an operation by the corresponding cartridge. The object type may be a specific word, a URL, or may include a virtual path such as "/java".

Once the configuration provider 256 has stored the configuration information for a particular cartridge in the metadata 258, that cartridge is automatically registered when web application server 280 is started.

After a cartridge is registered with the web application server 280, the resource manager 254 initiates the minimum instances for the cartridge. Once the minimum number of instances has been initiated, the web application server 280 is prepared to process browser requests.

The Virtual Path Manager

As mentioned above, dispatchers communicate with the virtual path manager 250 to determine where to route each revised browser request. Specifically, each browser request typically includes a URL. Upon receiving a browser request, the dispatcher sends the URL in the request to the virtual path manager 250. The virtual path manager 250 responds by sending the dispatcher data that identifies the cartridge, if any, associated with the URL.

In order to supply the required information to dispatchers, virtual path manager 250 consults the metadata 258 that maps URLs to cartridges. In response to receiving a browser request, the virtual path manager 250 uses the mapping data to determine the cartridge, if any, to which the URL contained in the browser requests corresponds.

For example, if the browser request is a URL request beginning with the virtual path "/java", the mapping may indicate that the JAVA interpreter cartridge is configured to handle requests having the virtual path "/java".

According to one embodiment of the invention, the virtual path manager 250 also determines whether the cartridge associated with the URL requires authentication. If the cartridge requires authentication, the virtual path manager 250 indicates in the response that the virtual path manager 250 sends to the dispatcher that authentication is required. If authentication is not required, the dispatcher creates and sends a revised browser request to an instance of the cartridge without invoking the authentication server 252. If authentication is required, the dispatcher sends the revised request to an instance of the cartridge only after the authentication server indicates that the revised request may be submitted to an instance of the cartridge.

The Resource Manager

The resource manager 254 of the web application server 280 manages the execution of each of the cartridges by initiating a predetermined minimum number of instances for the cartridges, load balancing between the instances of each cartridge, and initiating new instances of cartridges as necessary up to a predetermined maximum number of instances of a given cartridge.

For example, assume that the metadata for a particular cartridge (C1) includes the following information:

Name=C1
Minimum Instances=10
Maximum Instances=50
Host Machines=$M_1$, $M_2$, $M_3$
Idle time=30 seconds Based on this metadata, when cartridge C1 is first registered, resource manager 254 will initiate ten instances of C1. Resource manager 254 will initiate the ten instances on the machines associated with the labels $M_1$, $M_2$ and $M_3$.

Upon receipt of requests from dispatchers to access C1, resource manager 254 determines whether any existing instance of C1 is available for use. If no instance of C1 is available when a request is received, resource manager 254 determines whether the maximum number of instances of C1 are already running. If the maximum number of instances of C1 are not already running, then resource manager 254 initiates a new instance of C1 on one of the possible host machines and transmits a message that identifies the new instance to the dispatcher that issued the request. If the maximum number of instances of C1 are already running, then resource manager 254 sends a message to the dispatcher that issued the request to indicate that the request cannot be handled at this time.

Load Balancing

According to one embodiment of the invention, resource manager 254 applies a set of load balancing rules to determine where to initiate instances of cartridges where there is more than one possible host machine. Thus, in the above example, M1, M2 and M3 are all capable of executing instances of cartridge C1. If M1, M2 and M3 have the same processing capacity, it may be desirable to distribute the instances evenly across the three machines. However, if M1 has ten times the processing power of M2 and M3, it may be desirable to initiate all instances of C1 on M1 up to a certain point, and then to distribute additional instances evenly among M1, M2 and M3.

To assist resource manager 254 in determining how to load balance among possible machines, the metadata stored for each cartridge may include additional details. For example, the metadata may specify a separate minimum and maximum number of instances for each machine. The per-machine minimum and maximum values may be used instead of or in combination with a minimum and maximum value that applies to all machines. Resource manager 254 may then distribute new instances among the machines based on which machine has the lowest ratio of current executing instances to maximum allowable instances for that machine.

The metadata may also specify an order for the machines that can run a particular cartridge. The machine at the N+1 position in the order is only used to execute instances of the cartridge when the machine at the Nth position in the order is already executing its maximum number of instances allowed on the Nth machine.

Instead of or in addition to the maximum and actual number of instances on each particular machine, resource manager 254 may also consider various system parameters to determine which machine should host a new instance of a cartridge. Such parameters may include, for example, the amount of unused memory on a machine, the total number of processes currently running on the machine, the type of machine, etc. For each possible machine, resource manager 254 determines the weighted average of these parameters. The machine with the highest weighted average is then selected to host the new cartridge instance.

Cartridge Instance Status Tracking

According to one embodiment of the invention, the resource manager 254 maintains state information to keep track of cartridge instances that have been created. The state information includes data that identifies the instance, identifies the machine executing the instance, and identifies the listener to which the instance has been assigned.

FIG. 5 illustrates a table 500 that may be maintained by resource manager 254 to store this state information. Table 500 includes an instance column 502, a cartridge column 504, a listener column 506 and a machine column 508. Each row of table 500 corresponds to a distinct cartridge instance. Within the row for a given cartridge instance, cartridge column 504 identifies the cartridge associated with the cartridge instance and instance column 502 indicates the instance number of the cartridge instance. For example, row 510 corresponds to an instance of cartridge C1. Therefore, cartridge column 504 of row 510 indicates cartridge C1. Instance column 502 of row 510 indicates that the cartridge instance associated with row 510 is instance 1 of cartridge C1.

Listener column 506 indicates the listener to which the cartridge instance associated with a row has been assigned. Machine column 508 indicates the machine on which the cartridge instance associated with a row is executing. For example, the cartridge instance associated with row 510 has been assigned to listener 210 and is executing on machine M1.

Figure 4:
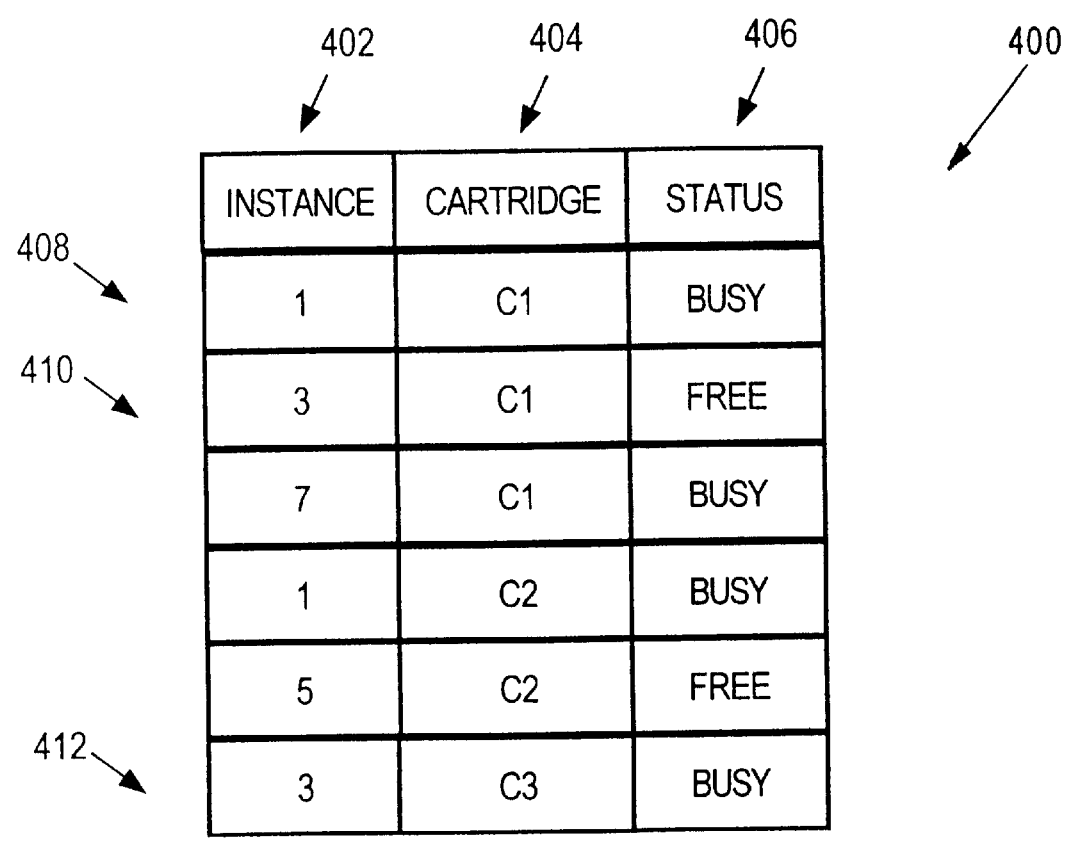

Similar to resource manager 254, each dispatcher maintains state information for the cartridge instances that have been assigned to the listener to which the dispatcher is attached. Such state information may be maintained, for example, in a table 400 as shown in FIG. 4. Similar to table 500, table 400 includes an instance column 402 and a cartridge column 404 that respectively hold instance numbers and cartridge identifiers. However, while table 500 includes one entry for every cartridge instance assigned by resource manager 254, table 400 only includes entries for cartridge instances that have been assigned to a particular listener. For example, table 400 includes entries for only those cartridge instances listed in table 500 that have been assigned to listener 210.

In addition to instance column 402 and cartridge column 404, table 400 includes a status column 406. For each row, the status column 406 holds a value that indicates the status of the instance associated with the row. For example, the status column 406 of row 408 indicates that instance 1 of cartridge C1 is currently busy. In the illustrated embodiment, the status column 406 holds a flag that indicates that a cartridge instance is either BUSY or FREE. The significance of the cartridge status shall now be describe with reference to the operation of resource manager 254 and dispatchers 214 and 220.

Interaction Between Dispatchers and the Resource Manager

As explained above, dispatchers communicate with resource manager 254 when they need to send a revised browser request to a particular cartridge. According to one embodiment of the invention, dispatchers first determine whether an instance of the appropriate cartridge (1) has already been assigned to it and (2) is available to process the new revised browser request. If an appropriate cartridge instance has already been assigned to the dispatcher and is currently available to process the new revised browser request, then the dispatcher forwards the revised browser request to the cartridge instance without further communication with resource manager 254.

For example, assume that listener 210 receives a browser request that, according to virtual path manager 250, must be processed by cartridge C1. Assume also that table 400 reflects the current list and status of cartridge instances that have been assigned to listener 210. Upon receiving the browser request from listener 210, dispatcher 214 inspects table 400 to locate a FREE instance of cartridge C1. In the illustrated table 400, row 410 indicates that instance 3 of cartridge C1 is currently FREE. Consequently, dispatcher 214 forwards a revised browser request directly to instance 3 of cartridge C1 without further communication with resource manager 254. In response to sending the revised browser request, dispatcher 214 changes the status value in status column 406 of row 410 to BUSY.

If a listener has not already been assigned an appropriate cartridge instance that is currently available, then the dispatcher associated with the cartridge requests a cartridge instance from the resource manager 254. If the resource manager 254 determines that an instance of the required cartridge is not available and the number of existing instances of the required cartridge is below the maximum, then the resource manager 254 initiates a new cartridge. Upon initiating a new cartridge, the resource manager 254 inserts an entry for the new cartridge instance in table 500.

Assume, for example, that listener 210 receives a browser request that must be processed by cartridge C3. Assume also that instance 3 of cartridge C3 has not yet been initiated. Under these conditions, dispatcher 214 sends to resource manager 254 a request for a handle to an instance of cartridge C3. In response to this request, resource manager 254 initiates instance 3 of cartridge C3 on machine M3. In addition, resource manager 254 inserts into table 500 the entry found at row 512.

After inserting row 512 for instance 3 of cartridge C3 in table 500, resource manager 254 sends back to the dispatcher 214 a handle to the newly created instance. In response to receiving this handle, dispatcher 214 inserts an entry (row 412) for the new instance in its status table 400. The dispatcher 214 then transmits a revised browser request to instance 3 of cartridge C3.

Releasing Cartridge Instances

According to one embodiment of the invention, listeners do not automatically release ownership of cartridge instances when the cartridge instances finish responding to outstanding browser requests. For example, assume that instance 3 of cartridge C3 receives a revised browser request, processes the revised browser request, and sends a response back to dispatcher 214. Dispatcher 214 passes the response to listener 210 to be sent back to the browser that issued the browser request.

At this point, listener 210 no longer requires ownership of instance 3 of cartridge C3. However, rather than transferring ownership of instance 3 of cartridge C3 back to resource manager 254, dispatcher 214 merely changes the status column 406 of row 412 from BUSY to FREE.

Changing the value in status column 406 of row 412 to FREE indicates that instance 3 of cartridge C3 is no longer working on a request, and is therefore ready to handle subsequent requests. However, because table 400, which indicates that instance 3 of cartridge C3 is available, is maintained locally by dispatcher 214, instance 3 of cartridge C3 is only available for subsequent browser requests arriving at listener 210. Row 512 of table 500 maintained by resource manager 254 continues to indicate that instance 3 of cartridge C3 is owned by listener 210.

Because listeners do not automatically release cartridge instances every time a request is serviced, overhead associated with communication between the resource manager 254 and the various dispatchers is significantly reduced. For example, assume that a listener 210 receives ten successive requests that must be communicated to cartridge C3. Rather than communicating with resource manager 254 for each of the ten requests, dispatcher 214 may communicate with resource manager 254 in response to the first request. The subsequent nine requests can be handled by dispatcher 214 without communicating with resource manager 254 because the dispatcher 214 uses the same instance of C3 that processes the first request to process the nine subsequent requests.

While not automatically releasing listener ownership of cartridge instances when each request is serviced can increase the efficiency of web application server 280, listeners cannot maintain ownership of cartridge instances indefinitely. For example, instances that have not been used for long periods of time should be passed back to the resource manager 254 so they can be de-allocated to free up resources. In addition, it is not efficient for one listener to maintain ownership of the instance of a cartridge that it has not used for a relatively long time when other listeners require instances of that cartridge.

Consequently, resource manager 254 communicates to each listener a maximum idle time for each cartridge instance passed to the listener. The maximum idle time indicates the maximum amount of time a cartridge instance can go unused before the listener must release ownership of the cartridge instance. For example, assume that the resource manager 254 indicates to listener 210 that the maximum amount of idle time for instance 3 of cartridge C3 is 10 minutes. Based on this information, listener 210 may continue to use instance 3 of cartridge C3 to process browser requests for cartridge C3 as long as instance 3 of cartridge C3 does not remain idle or FREE for more than 10 minutes.

If instance 3 of cartridge C3 is idle for more than 10 minutes, dispatcher 214 removes row 412 from table 400 and sends a message to resource manager 254 that listener 210 is releasing ownership of instance 3 of cartridge C3. In response to this message, resource manager 254 updates row 512 to indicate that instance 3 of cartridge C3 is not owned by any listener and may thus be reassigned to another listener or terminated.

In an alternative embodiment, dispatchers do not automatically release cartridge instances when the idle time for the cartridge instance has expired. Instead, the dispatcher sends a message to resource manager 254 offering to release the expired instance. Resource manager 254 may respond to the offer by requesting that the listener release the cartridge instance, or by allowing the listener to retain ownership of the expired cartridge instance.

According to one embodiment of the invention, resource manager 254 maintains a queue of the requests that cannot be immediately serviced. When it becomes possible to service a queued request, the request is removed from the queue and processed.

For example, assume that listener 222 receives a browser request that must be processed by cartridge C1, and that listener 222 has not been assigned any instances of cartridge C1. Dispatcher 226 sends a request for an instance of C1 to resource manager 254. Assume further that a maximum of 50 instances of C1 are allowed, and that 50 instances of C1 have been assigned to listener 210. Under these conditions, resource manager 254 cannot service the request from listener 222. Therefore, resource manager 254 puts the request on a queue. When listener 210 releases an instance of C1, resource manager 254 communicates to listener 222 that an instance of C1 is available.

Under certain conditions, resource manager 254 may preemptively cause a listener to release a cartridge instance. For example, resource manager 254 may detect a system overload situation and respond by terminating a set of cartridge instances, either before or after informing the listeners that currently have been assigned the cartridge instances that the cartridge instances are going to be terminated.

Resource manager 254 may also preemptively cause listeners to release cartridge instances to implement fairness policies between listeners. For example, resource manager 254 may cause a listener that holds the most instances of a given cartridge to release an instance of the cartridge when another listener has waited more than a predetermined threshold of amount of time for an instance of the cartridge. For example, if listener 210 has been assigned 50 instances of cartridge C1 and C1 has a maximum of 50 instances, then resource manager 254 may cause listener 210 to release an instance of C1 ten seconds after receiving a request for an instance of C1 from another listener.

Cartridge Execution Engines

According to one embodiment of the invention, each cartridge instance is composed of a cartridge execution engine and a cartridge. A cartridge execution engine is a code module that insulates cartridges from the complexities of the web application server 280 and the inter-machine communication mechanism that is employed to carry the messages between the various components of the web application server 280.

A cartridge is made available to a cartridge execution engine by storing pointers to the cartridge functions in a function table. According to one embodiment, all cartridges provide the functions specified in the exemplary cartridge interface described above. By having all cartridges support the same interface, a single standard cartridge execution engine can be used with all cartridges.

As shown in FIG. 2, the web application server 280 includes cartridge execution engines 228, 232 and 236 for each of the cartridges 230, 234 and 238. The cartridge execution engines control execution of the corresponding cartridges by making calls into the cartridges through the standard cartridge interface. By establishing basic callback functions between the cartridge execution engine and a cartridge, any cartridge can be integrated into the web application server 280 by configuring the cartridge to respond to the callback functions, and then registering the cartridge in the configuration provider 256.

According to one embodiment of the invention, cartridges are implemented as shared libraries, and cartridge execution engines are executable programs that invoke the routines in the shared libraries using the standard cartridge interface. The cartridge execution engine provides the interface between cartridges and the dispatcher, directs cartridge flow of control, and provides services for cartridges to use.

When the resource manager 254 requires the creation of a new cartridge instance, the resource manager 254 causes a cartridge execution engine to be instantiated. In turn, the instance of the cartridge execution engine thus created causes the appropriate cartridge to be instantiated. The resource manager 254 can cause the cartridge execution engine to be instantiated, for example, by invoking a "cartridge execution engine factory" that resides on the machine on which the cartridge is to be executed. The instance of the cartridge execution engine can cause the cartridge to be instantiated, for example, by making a call to one of the routines in the shared library that constitutes the cartridge.

In embodiments in which cartridges are implemented as shared libraries, the cartridges and cartridge execution engines execute as a single process. That is, a cartridge executes on the same machine and in the same address space as the cartridge execution engine that makes calls into the cartridge. In such embodiments, the cartridge can be statically linked to the cartridge execution engine before execution, or dynamically linked to the cartridge execution engine at runtime.

According to an alternative embodiment, cartridge execution engines may execute as separate processes from the cartridges with which they communicate. However, to reduce the programming burden of cartridge developers, the cartridge execution engine process and its corresponding cartridge process execute on the same machine.

Significantly, in both the single-process and separate-process embodiments, the cartridge developer need not address the complexities of inter-machine communication. All communication between a cartridge and components of the web application server that are distributed across other machines is performed through the cartridge execution engine, which is on the same machine as the cartridge. The cartridge can thus be said to be unaware that it is being used in a system that is distributed across multiple machines.

Cartridge Wapper Example

Referring to FIG. 2, if the dispatcher 214 determines that the PL/SQL runtime cartridge is the appropriate cartridge to process a request, the dispatcher 214 dispatches the request to a cartridge instance that includes a cartridge execution engine associated with the PL/SQL runtime cartridge. If a new instance needs to be initiated, the resource manager 254 creates a new instance of the PL/SQL runtime cartridge in a separate address space and dispatches the request to the cartridge execution engine 228 of the new instance. The address space used to execute the instance of the program may be within memory of the computer system upon which one or more of the components of web application server 280 is executing, or on another computer system.

In response to a message from a dispatcher, the cartridge execution engine issues a request handler callback function to the cartridge, causing the cartridge to process the request. The cartridge executing the request returns the result to the cartridge execution engine, which forwards the result to the dispatcher. In the event that the web application server 280 detects a fault in the operation, the cartridge execution engine issues a shutdown function of the cartridge.

Hence, the cartridge execution engine provides an application programming interface to the web application server 280 that specifies predetermined operations to be performed. Use of the standard cartridge interface enables programmers of the cartridges to configure each cartridge for high-level integration into the web application server 280 independent of the protocols used by the particular web listener with which the cartridge will be used.

Transport Adapters

Listeners enable the use of server-side plug-ins by providing a programming interface and protocol for use by such plug-ins. Unfortunately, the programming interfaces and protocols provided by listeners vary from listener to listener. For example, Netscape Server Application Programming Interface (NSAPI), Internet Server Application Programming Interface (ISAPI) and Application Development Interface (ADI) are three examples of distinct programming interfaces currently provided by listeners.

Transport adapters insulate dispatchers from the proprietary protocols and interfaces used by web listeners. Specifically, each transport adapter is configured to recognize the protocols of different listeners, and to convert the browser requests received from the listeners into converted browser requests having a standard dispatcher protocol that is independent from the protocol of the listener. Similarly, transport adapters convert the replies from the dispatcher to the transport protocol of the listeners.

Hence, the transport adapter enables the web application server 280 to be used with listeners from different vendors. Moreover, transport adapters may be configured to accommodate different server architectures and operating systems.

Operation of the Web Application Server

Figure 3A:
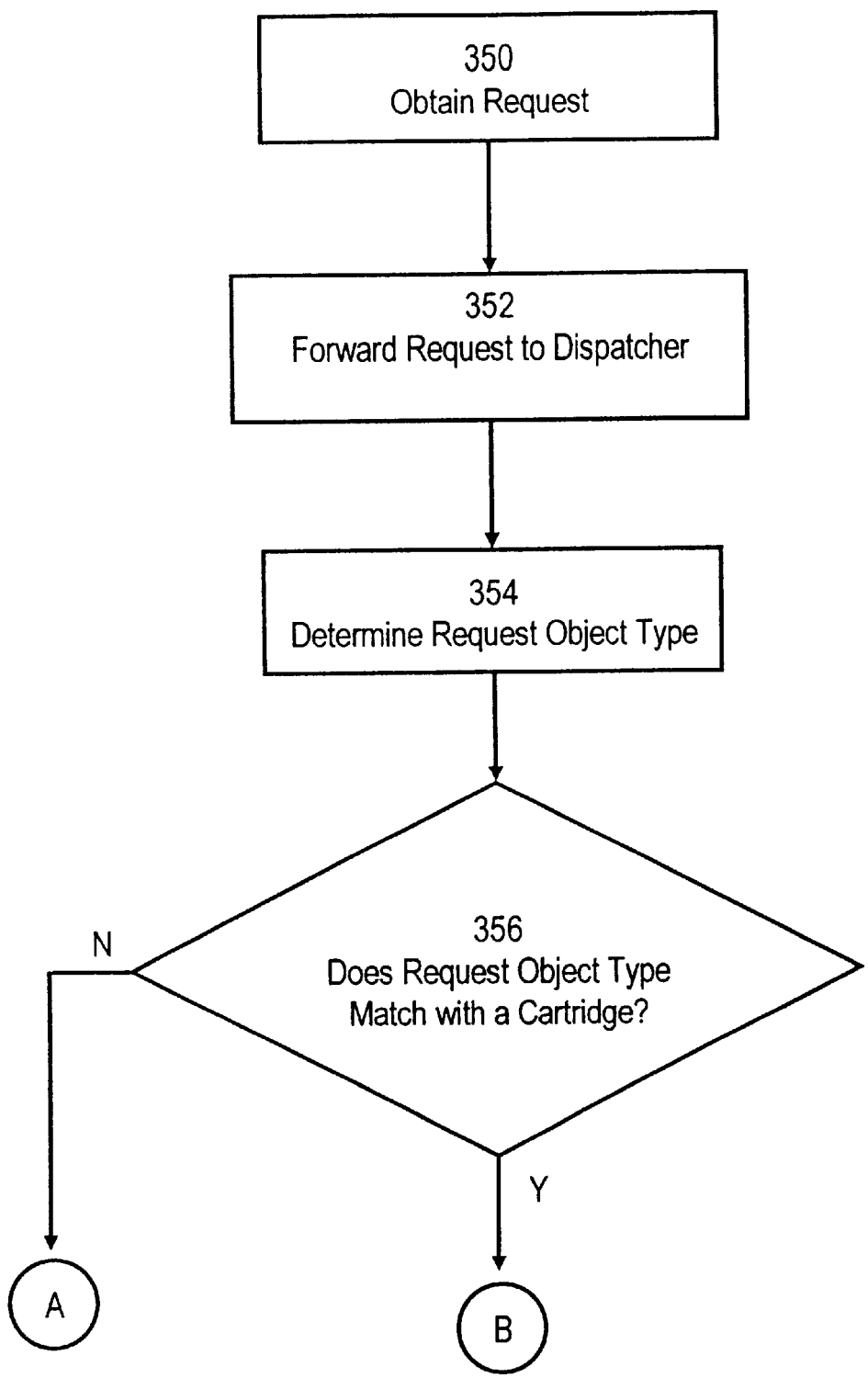
FIG. 3A is a portion of a flow chart illustrating steps for handling a browser request according to an embodiment of the invention.
Figure 3B:
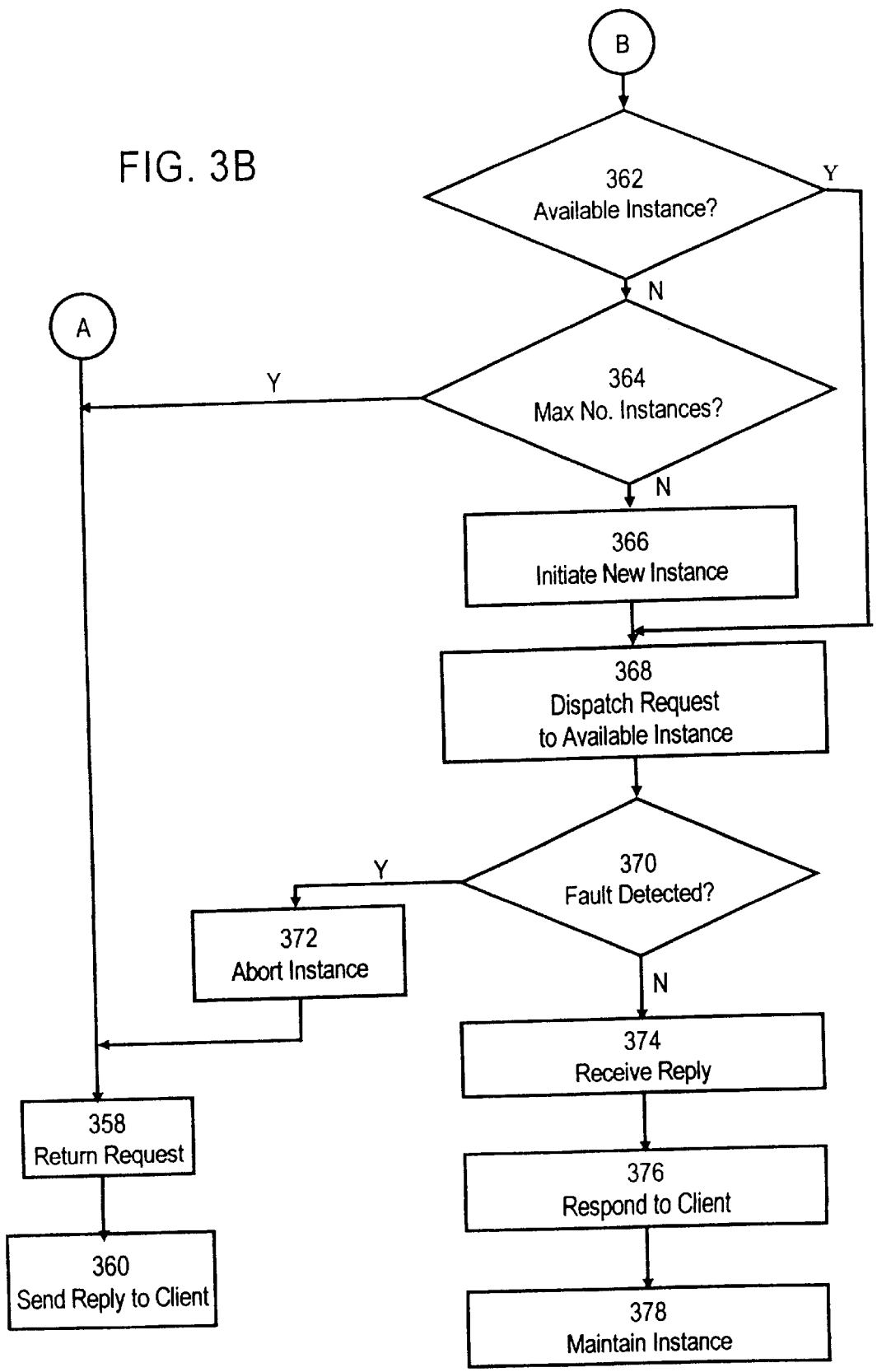
FIG. 3B is another portion of the flow chart illustrating steps for handling a browser request according to an embodiment of the invention.

FIGS. 3A and 3B are a flow diagram illustrating a method of responding to a browser request according to an embodiment of the present invention. The browser request is received in step 350 by a listener. For the purposes of explanation, it shall be assumed that the browser request was issued by browser 202 and received by listener 210.

Upon receiving the browser request, the listener 210 forwards the request to the web application server 280 in step 352. Specifically, listener 210 passes the request to the transport adapter 212 using the proprietary programming interface of the listener 210. The transport adapter 212 converts the request as necessary to pass the request to dispatcher 214 using a standard dispatcher programming interface.

Dispatcher 214 identifies the request object type that corresponds to the browser request in step 354 based on the virtual path specified in the browser request by communicating with the virtual path manager 250. The dispatcher 214 determines in step 356 if the request object type corresponds to an identifiable cartridge. If the request object type does not correspond to an identifiable cartridge, the request is returned to the listener 210 in step 358 (see FIG. 3B). If in step 358 the listener 210 recognizes the request as a request for a static HTML page, the listener accesses the static HTML page, and sends the HTML page to the browser 202 in step 360. If the browser request is not recognized by the listener 210, the reply is sent to the browser 202 in step 360 indicating that the request was unrecognizable.

If in step 356 the dispatcher 214 determines that (1) the request must be sent to a cartridge and (2) listener 210 has not been assigned any instances of that cartridge that are currently FREE, then the dispatcher 214 communicates with the resource manager 254 to be assigned an instance of the cartridge 230 to which the browser request can be sent. In step 362, shown in FIG. 3B, the resource manager 254 determines whether an instance of the identified cartridge is available (unowned) among the existing number of instances. For the purposes of explanation, it shall be assumed that the request is associated with cartridge 230, and that cartridge 230 is a PL/SQL runtime cartridge.

If in step 362 the resource manager identifies an available instance, for example instance 260 of the PL/SQL runtime 230, the resource manager 254 informs the dispatcher 214 that the request should be sent to instance 260. The dispatcher 214 then creates and sends a revised browser request to the cartridge execution engine 228 of the instance 260 in step 368 to cause the available instance 260 to process the request, as described below.

However, if in step 362 no instance of the cartridge 230 is available, the resource manager 254 determines in step 364 if the existing number of instances exceeds a maximum prescribed number. If the existing number of instances exceeds the maximum prescribed number in step 364, the resource manager 254 indicates to the dispatcher 214 that the request cannot be processed at this time. In response, the dispatcher 214 returns the request to the listener 210 in step 358, after which the web listener 210 sends a reply to the browser 202 over the network in step 360 indicating the request was not processed.

Alternatively, when a cartridge instance is not currently available to handle a request, listener 210 may place the request on a waiting list for that cartridge instance. When a cartridge instance becomes available, the revised browser request is removed from the waiting list and forwarded to the cartridge instance. If the revised browser request remains on the waiting list for more than a predetermined amount of time, listener 210 may remove the request from the waiting list and send a message to the browser 202 to indicate that the request could not be processed.

If in step 364 the existing number of instances does not exceed the maximum prescribed number, the resource manager 254 initiates a new instance of the identified program and informs the dispatcher 214 that a revised browser request based on the browser request should be sent to the new instance. The dispatcher 214 then dispatches a revised browser request to the cartridge execution engine of the new instance.

For example, assume that the resource manager 254 initiated instance 260 in response to the browser request. During the initialization, the stored sequences of instructions for the PL/SQL runtime are accessed to create a new instance 260 of the cartridge 230 in an address space that is separate from the address space in which dispatcher 214 is executing. According to one embodiment, initialization is performed by loading the cartridge execution engine 228 and having the cartridge execution engine call the initialization routine in cartridge 230.

Once the new instance 260 is running, the dispatcher 214 dispatches the request to the cartridge execution engine 228 associated with the new instance 260 in step 368. The cartridge execution engine 228 sends a callback message to the new instance 260 requesting execution of the request. In the callback message, the cartridge execution engine 228 passes any parameters necessary for the instance 260 to process the request. Such parameters may include, for example, passwords, database search keys, or any other argument for a dynamic operation executed by the instance 260.

The instance 260 then executes the request. During the execution of the request by the instance in step 368, the dispatcher 214 monitors the instance to determine the occurrence of a fault in step 370. If in step 370 the dispatcher 214 detects a fault, the dispatcher 214 calls the corresponding cartridge execution engine 228 in step 372 to abort the instance 260 having the fault. The corresponding cartridge execution engine 228 in turn issues a shut down command across the API to the faulty instance. The instance, responding to the shut down command by the cartridge execution engine 228, will shut down without affecting any other process in any other address space.

If in step 370 no fault is detected, the dispatcher 214 receives a reply from the instance 260 upon completion of execution in step 374. The dispatcher 214 in step 376 forwards the reply to the listener 210, which responds to the browser with the reply from the executed instance 260. After executing the instance 260, the dispatcher 214 in step 378 maintains the instance in the memory, as shown in step 378 to enable execution of a subsequent request.

Distributed Architecture of Web Server

Significantly, the various components of the web application server 280 communicate with each other using a communication mechanism that does not require the components to be executing in the same address space or even on the same machine. In the illustrated embodiment, the components of the web application server 280 are configured to communicate through an Object Request Broker (ORB) 282. Object Request Brokers are described in detail in "Common Object Request Broker: Architecture and Specification (CORBA)". This and other documents relating to CORBA can be found on the World Wide Web at http://www.omg.org.

While the embodiments of the present invention shall be described with reference to communications through a CORBA-compliant ORB, other cross-platform communication mechanisms may be used. For example, the components of web application server 280 may alternatively communicate with each other using Remote Procedure Calls (RPC), a UNIX pipe, Microsoft COM.

Because the various components of the web application server 280 communicate with each other using a machine independent communication mechanism, there are no inherent restrictions with respect to where the components are located with respect to each other. For example, listeners 210, 216 and 222 may be executing on the same machine, or on three completely different machines, each with a different operating system. Similarly, the authentication server 252, virtual path manager 250, resource manager 254 and configuration provider 256 may be executing on the same machine or on four different machines. Further, those four different machines may not have any overlap with the three machines executing listeners 210, 216 and 222.

Cartridge execution engines 228, 232 and 236 incorporate all of the necessary logic to communicate with the other components of the web application server 280 through the object request broker 282. Consequently, the location of the cartridge instances themselves is not inherently restricted by the communication mechanism. Thus, instance 260 may be executing in a completely different machine and operating system than dispatchers from which it receives requests. Likewise, instance 260 may be on a different machine and operating system than the resource manager 254 or any of the other components of the web application server 280, including instances of other cartridges that are being managed by the same web application server 280.

Cartridge Isolation

Significantly, the location-independence enjoyed by cartridges used by web application server 280 is achieved through the cartridge execution engine communication logic, not through any custom programming in the cartridges themselves. Consequently, the cartridges do not need to be specially designed for execution in a distributed application server environment. Cartridge designers are thus insulated from the complexities of a distributed system, and can concentrate their efforts on the logic associated with the tasks for which the cartridges were created.

For example, when the inter-machine communication mechanism is an object request broker, all modules communicating through the object request broker are required to define their interfaces using an Interface Definition Language (IDL) and must inherit and build upon certain base classes. These and other intricacies make it relatively complex to build modules capable of inter-machine communication. Because cartridge execution engines insulate cartridges from the object request broker, the cartridge developers do not have to comply with these restrictions. Cartridge developers can thus concentrate their efforts on writing code to accomplish the specific operations that the cartridges will be called upon to perform.

As described above, a web application server 280 that manages multiple instances of different cartridges to process a variety of user requests is provided. Each cartridge instance executes in a separate memory space from the listener, thus avoiding the security problems associated with server-side plug-ins. Further, the cartridge instances used to process the browser requests received by a listener may execute on entirely different machines than the listener. Thus, the scalability of the system is increased, while the burden on any particular machine is reduced.

In addition, web application server 280 also controls the number of instances for each given cartridge. Hence, server-side resources are controlled to ensure that a large number of requests do not overwhelm any machine by an uncontrollable generation of instances.

Further, execution throughput also is improved by maintaining a minimum number of instances ready for execution. Additional instances may be initiated and maintained in memory for executing subsequent requests, as opposed to terminating an instance after a single execution and then reloading the cartridge into memory in order to recreate an instance for execution of a subsequent request.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for executing an operation in a distributed system, the method comprising the steps of:

executing a dispatcher on a first machine;

executing a cartridge execution engine on a second machine, wherein said second machine is different from said first machine;

said dispatcher receiving from a web listener a first message that requests execution of said operation, wherein said first message was sent to said dispatcher in response to said web listener receiving a browser request from a browser;

in response to said first message, said dispatcher sending a second message to the cartridge execution engine over an inter-machine communication mechanism;

in response to said second message, said cartridge execution engine passing a third message, through a standard cartridge interface, to a cartridge that is executing on said second machine, wherein said cartridge is one of a plurality of cartridges that each contain routines that are called through the standard cartridge interface, wherein different cartridges of said plurality of cartridges implement said routines differently thereby causing each of said different cartridges to perform different operations in response to calls received through said standard cartridge interface; and in response to receiving said third message, said cartridge executing said operation.

2. The method of claim 1 further comprising the steps of:

after executing said operation, said cartridge passing a fourth message to said cartridge execution engine;

in response to said fourth message, said cartridge execution engine sending a fifth message to said dispatcher; and in response to said fifth message, said dispatcher sending a sixth message to said web listener for said web listener to forward to said browser.

3. The method of claim 2 wherein the step of said dispatcher sending a second message to the cartridge execution engine is performed by said dispatcher sending a second message to the cartridge execution engine through an object request broker.

4. The method of claim 3 wherein the step of said cartridge execution engine sending a fifth message to said dispatcher is performed by said cartridge execution engine sending a fifth message to said dispatcher through said object request broker.

5. The method of claim 2 wherein:

the step of said cartridge execution engine passing a third message to a cartridge is performed by said cartridge execution engine calling a routine in said cartridge; and the step of said cartridge passing a fourth message to said cartridge execution engine is performed by returning from said routine called in said cartridge.

6. The method of claim 1 wherein:

said cartridge is a shared library; and the step of said cartridge execution engine passing a third message to said cartridge comprises the step of said cartridge making a call to a routine in said shared library.

7. The method of claim 6 further comprising the step of statically linking said cartridge execution engine to said cartridge at compile time.

8. The method of claim 6 further comprising the step of dynamically linking said cartridge execution engine to said cartridge at runtime.

9. The method of claim 1 wherein the cartridge execution engine communicates with said cartridge through a particular application programming interface; and the method further comprises the step of said cartridge execution engine communicating through said particular application programming interface with a second cartridge that performs different operations than said cartridge.

10. A computer-readable medium carrying one or more sequences of instructions for executing an operation in a distributed system, wherein execution of the one or more sequences of instructions by one or more processors causes the one or more processors to perform the steps of:

executing a dispatcher on a first machine;

executing a cartridge execution engine on a second machine, wherein said second machine is different from said first machine;

said dispatcher receiving from a web listener a first message that requests execution of said operation, wherein said first message was sent to said dispatcher in response to said web listener receiving a browser request from a browser;

in response to said first message, said dispatcher sending a second message to the cartridge execution engine over an inter-machine communication mechanism;

in response to said second message, said cartridge execution engine passing a third message, through a standard cartridge interface, to a cartridge that is executing on said second machine, wherein said cartridge is one of a plurality of cartridges that each contain routines that are called through the standard cartridge interface, wherein different cartridges of said plurality of cartridges implement said routines differently thereby causing each of said different cartridges to perform different operations in response to calls received through said standard cartridge interface; and in response to receiving said third message, said cartridge executing said operation.

11. The computer-readable medium of claim 10 further comprising instructions for performing the steps of:

after executing said operation, said cartridge passing a fourth message to said cartridge execution engine;

in response to said fourth message, said cartridge execution engine sending a fifth message to said dispatcher; and in response to said fifth message, said dispatcher sending a sixth message to said web listener for said web listener to forward to said browser.

12. The computer-readable medium of claim 11 wherein the step of said dispatcher sending a second message to the cartridge execution engine is performed by said dispatcher sending a second message to the cartridge execution engine through an object request broker.

13. The computer-readable medium of claim 12 wherein the step of said cartridge execution engine sending a fifth message to said dispatcher is performed by said cartridge execution engine sending a fifth message to said dispatcher through said object request broker.

14. The computer-readable medium of claim 11 wherein:

the step of said cartridge execution engine passing a third message to a cartridge is performed by said cartridge execution engine calling a routine in said cartridge; and the step of said cartridge passing a fourth message to said cartridge execution engine is performed by returning from said routine called in said cartridge.

15. The computer-readable medium of claim 10 wherein:

said cartridge is a shared library; and the step of said cartridge execution engine passing a third message to said cartridge comprises the step of said cartridge making a call to a routine in said shared library.

16. The computer-readable medium of claim 10 wherein:

the cartridge execution engine communicates with said cartridge through a particular application programming interface; and the computer-readable medium further comprises the step of said cartridge execution engine communicating through said particular application programming interface with a second cartridge that performs different operations than said cartridge.

17. A system for performing operations associated with browser requests, the system comprising:

a plurality of dispatchers coupled to a plurality of web listeners;

an inter-machine communication mechanism;

a plurality of cartridges, wherein each of said cartridges contains routines that are called through a standard cartridge interface, wherein different cartridges perform different operations in response to calls received through said standard cartridge interface;

a plurality of cartridge execution engines that communicate with said plurality of dispatchers through said inter-machine communication mechanism and communicate with said plurality of cartridges by making calls to said routines in said plurality of cartridges through said standard cartridge interface;

wherein each dispatcher of said plurality of dispatchers is configured to send through said inter-machine communication mechanism a first message to a particular cartridge execution engine of said plurality of cartridge execution engines in response to a web listener receiving a browser request that requires a particular cartridge to perform an operation; and wherein said particular cartridge execution engine is configured to respond to said first message by calling through said standard cartridge interface a routine in said particular cartridge that performs said operation.

18. The system of claim 17 wherein:

said inter-machine communication mechanism is transparent to the particular cartridge;

said particular cartridge is configured to send a second message to said particular cartridge execution engine through said standard cartridge interface upon return from said routine; and said particular cartridge execution engine is configured to send a third message based on said second message to said dispatcher through said inter-machine communication mechanism.

19. The system of claim 17 wherein said inter-machine communication mechanism is an object request broker.

20. A method for causing a module of a distributed system to perform operations in a distribution unaware manner, the method comprising the steps of:

executing said module on a particular machine;

passing through a cartridge execution engine associated with said module requests to said module from other components of said distributed system;

passing through said cartridge execution engine associated with said module replies from said module to said other components of said distributed system;

wherein said cartridge execution engine and said module are executing on a first machine; and wherein said other components are not executing on said first machine.

21. The method of claim 20 wherein:

the step of passing through a cartridge execution engine associated with said module requests to said module from other components of said distributed system includes the steps of sending said request to said cartridge execution engine through an inter-machine communication mechanism; and sending said requests from said cartridge execution engine to said module by causing said cartridge execution engine to call a routine in said module.

22. The method of claim 21 wherein the step of sending said request to said cartridge execution engine through an inter-machine communication mechanism is performed by sending said request to said cartridge execution engine through an object request broker.

23. A method for performing operations associated with browser requests, the method comprising the steps of:

executing a plurality of dispatchers that are coupled to a plurality of web listeners;

executing a plurality of cartridges, wherein each of said cartridges contains routines that are called through a standard cartridge interface, wherein different cartridges perform different operations in response to calls received through said standard cartridge interface;

executing a plurality of cartridge execution engines that communicate with said plurality of dispatchers through an inter-machine communication mechanism and communicate with said plurality of cartridges by making calls to said routines in said plurality of cartridges through said standard cartridge interface;

wherein each dispatcher of said plurality of dispatchers is configured to send through said inter-machine communication mechanism a first message to a particular cartridge execution engine of said plurality of cartridge execution engines in response to a web listener receiving a browser request that requires a particular cartridge to perform an operation; and wherein said particular cartridge execution engine is configured to respond to said first message by calling through said standard cartridge interface a routine in said particular cartridge that performs said operation.

24. The method of claim 23 further comprising the steps of:

configuring said inter-machine communication mechanism to be transparent to the particular cartridge;

configuring said particular cartridge to send a second message to said particular cartridge execution engine through said standard cartridge interface upon return from said routine; and configuring said particular cartridge execution engine to send a third message based on said second message to said dispatcher through said inter-machine communication mechanism.

25. The method of claim 23 wherein said inter-machine communication mechanism is configured as an object request broker.

26. A computer-readable medium carrying one or more sequences of instructions for causing a module of a distributed system to perform operations in a distribution unaware manner, wherein execution of the one or more sequences of instructions by one or more processors causes the one or more processors to perform the steps of:

executing said module on a particular machine;

passing through a cartridge execution engine associated with said module requests to said module from other components of said distributed system;

passing through said cartridge execution engine associated with said module replies from said module to said other components of said distributed system;

wherein said cartridge execution engine and said module are executing on a first machine; and wherein said other components are not executing on said first machine.

27. The computer-readable medium of claim 26 wherein:

the step of passing through a cartridge execution engine associated with said module requests to said module from other components of said distributed system includes the steps of sending said request to said cartridge execution engine through an inter-machine communication mechanism; and sending said requests from said cartridge execution engine to said module by causing said cartridge execution engine to call a routine in said module.

28. The computer-readable medium of claim 27 wherein the step of sending said request to said cartridge execution engine through an inter-machine communication mechanism is performed by sending said request to said cartridge execution engine through an object request broker.

* * * * *

UNITED STATES PATENT AND TRADEMARK OFFICE
CERTIFICATE OF CORRECTION

PATENT NO. : 6,026,404
DATED : February 15, 2000
INVENTOR(S) : Adunuthula, et al.

It is certified that error appears in the above-identified patent and that said Letters Patent is hereby corrected as shown below:

Title page,
Replace "METHOD AND SYSTEM FOR EXECUTING AND OPERATION IN A DISTRIBUTED ENVIRONMENT"

with -- METHOD AND SYSTEM FOR EXECUTING AN OPERATION IN A DISTRIBUTED ENVIRONMENT --.

Signed and Sealed this

Twenty-fifth Day of September, 2001

*Attest:*

NICHOLAS P. GODICI
*Attesting Officer*     *Acting Director of the United States Patent and Trademark Office*